United States Patent
Iwawaki et al.

(10) Patent No.: US 8,711,111 B2
(45) Date of Patent: Apr. 29, 2014

(54) HOLDING STRUCTURE FOR A TOUCH PANEL

(75) Inventors: Shinya Iwawaki, Toyama (JP); Kazuo Imai, Toyama (JP); Takayuki Mizuki, Toyama (JP)

(73) Assignee: SMK Corporation, Tokyo (JP)

( * ) Notice: Subject to any disclaimer, the term of this patent is extended or adjusted under 35 U.S.C. 154(b) by 811 days.

(21) Appl. No.: 12/898,700

(22) Filed: Oct. 5, 2010

(65) Prior Publication Data
US 2011/0102342 A1    May 5, 2011

(30) Foreign Application Priority Data

Nov. 2, 2009  (JP) .................................. 2009-252059
Nov. 12, 2009 (JP) .................................. 2009-259031

(51) Int. Cl.
- *G06F 3/041*  (2006.01)
- *G06F 3/042*  (2006.01)
- *G02F 1/1343*  (2006.01)
- *H05K 9/00*  (2006.01)

(52) U.S. Cl.
USPC ............ 345/173; 345/175; 361/692; 361/752

(58) Field of Classification Search
CPC ....... G06F 1/1643; G06F 3/016; G06F 3/041; G06F 1/1626; G06F 3/03547
See application file for complete search history.

(56) References Cited

U.S. PATENT DOCUMENTS

| 6,532,152 B1 * | 3/2003 | White et al. .................. 361/692 |
| 2006/0192657 A1 | 8/2006 | Nishimura et al. |
| 2008/0246741 A1 * | 10/2008 | Hinata .......................... 345/173 |
| 2011/0102342 A1 * | 5/2011 | Iwawaki et al. ............... 345/173 |

FOREIGN PATENT DOCUMENTS

| JP | 07-105781 A | 4/1995 |
| JP | 09-115378 A | 5/1997 |
| JP | 2000-276254 A | 10/2000 |
| JP | 2000276254 A * | 10/2000 ................ G06F 1/16 |
| JP | 2002-229672 A | 8/2002 |
| JP | 2006-227712 A | 8/2006 |

OTHER PUBLICATIONS

Applicants bring the attention of the Examiner to the following pending U.S. Appl. Nos. 12/899,479, filed Oct. 6, 2010 and 12/898,693, filed Oct. 5, 2010.

* cited by examiner

*Primary Examiner* — Dwayne Bost
*Assistant Examiner* — Scott Trandai

(57) ABSTRACT

A holding structure for a touch panel has a display panel, a touch panel for allowing an input operation, a supporting frame for holding the display panel at an entire peripheral edge a piezoelectric device for applying vibration to the touch panel in accordance with the operation of the touch panel, a casing for holding the display panel and the touch panel via the supporting frame, and a flexible resin sheet integrally provided to the front surface side of the touch panel. The flexible substrate is formed to have a size entirely larger than a glass substrate on a rear surface side of the touch panel. The peripheral edge of the flexible substrate is held by a rear surface of a peripheral edge of the opening of the casing and a supporting member fixed to the casing.

10 Claims, 6 Drawing Sheets

HOLDING STRUCTURE FOR A TOUCH PANEL

CROSS REFERENCE TO RELATED APPLICATION

The contents of the following patent applications are incorporated herein by reference,
NO. 2009-252059 filed on Nov. 2, 2009, and
NO. 2009-259031 filed on Nov. 12, 2009.

BACKGROUND

1. Technical Field

This invention relates to a holding structure for a touch panel, which is provided at a display or an operation unit of a variety of electronic devices and being used as an input device.

2. Description of the Related Art

Conventionally, electronic devices having touch panel function as input means at the display surface have been widely used. One of the structures of the touch panels was a resistance-sensitive type. In the touch panel, a transparent ITO (indium oxide) film is formed on the surface of the touch panel glass in a predetermined pattern. Electrodes are connected to the end portion of the ITO film and the peripheries are coated by over-coating. And dot spacers are provided between the upper layer flexible substrate made of PET resin or the like and the lower layer glass substrate both on which ITO films are deposited. When an operator presses the surface of the touch panel, the ITO films on the upper and lower panels get in contact with each other. The pressed position on the panel is detected in accordance with the resistance value at that time.

The touch panel device is disposed overlapping on the liquid crystal panel or the like, and an operator carries out the input operation by directly touching such display surface. Even though the ITO films on the upper and the lower panels get in contact with each other when an operator presses the surface of the touch panel, the operator can neither feel nor be sure whether the contact is closed or not. And so, there is a touch panel with a so-called force feedback function which vibrates the touch panel by detecting the pressing operation and gives an operator an operation feeling.

As it is shown in FIG. 5, the touch panel device 1 equipped with the force feedback function is applied, for example, to handheld information equipment or the like. The liquid crystal panel 2 and the touch panel 4 are accommodated in the casing 6 made of resin or the like and the touch panel 4 is exposed from the opening 6a as it is shown in FIG. 6. The liquid crystal panel 2 is provided with a printed circuit substrate 7 and the substrate is held in a chassis 8. As it is described above, the touch panel 4 is composed of a flexible circuit substrate 4a provided at the front surface side and a glass substrate 4b provided at the rear surface side. The flexible circuit substrate 4a is a substrate made of PET resin or the like and a conductive pattern is formed on the front surface. The glass substrate 4b is a substrate made of glass and a conductive pattern is formed on the front surface. Moreover, piezoelectric devices for the force feedback purpose are disposed at the side edge of the touch panel 4.

In the case of the touch panel device 1 equipped with the force feedback function, elastic supporters 5 made of rubber or the like are provided at the four corners between the liquid crystal panel 2 and the touch panel 4 in the casing 6 in order to absorb the vibration of the touch panel 4 due to the piezoelectric device and to hold the touch panel 4. A bit of interspace 6b is formed between the peripheral edge of the opening 6a of the casing 6 and the front surface of the touch panel 4.

On the other hand, as a structure that secures the dust-proof feature and the drip-proof feature on the front surface of the touch panel for the touch panel with no force feedback function, there is a structure that the peripheral edges of the touch panel and the rear surface side of the opening of the casing of the touch panel device are bonded by way of a seal member, as it is disclosed in Japanese Patent Application Publication No. 2002-2229672. And, such a structure is proposed that a rubber packing holds the peripheral edge of the touch panel and both of the peripheral edge of the opening of the casing and a fixing member like chassis hold the rubber packing, as it is disclosed in Japanese Patent Application Publication No. 2000-276254.

In the case of the touch panel device equipped with the force feedback function shown in FIG. 6 of the related arts mentioned above, a bit of interspace 6b is disposed between the peripheral edge of the opening 6a of the casing and the front surface of the touch panel 4 in order to vibrate the touch panel, and there remains a problem that dust or drips are liable to enter from the outside and to give a bad influence on the liquid crystal panel 2 or other electronic elements.

On the other hand, as it is disclosed in Japanese Patent Application Publication No. 2002-229672 and No. 2000-276254, the dust-proof feature and the drip-proof feature become improved by making close contact and fixing the front surface of the touch panel with the peripheral edge of the opening of the casing, however, there remains a problem that the vibration of the touch panel is suppressed and the force feedback function comes to be deteriorated.

SUMMARY

The present invention is achieved in consideration of the problems of the related arts mentioned above. The purpose of this invention is to provide a holding structure for a touch panel with a simple composition, of high dust-proof feature and drip-proof feature, and with effective transmission characteristics of the vibration of the touch panel to the operator.

According to one aspect related to the innovations herein, one exemplary holding structure for a touch panel may include a display panel for forming a display screen, a touch panel disposed outside the display panel, for allowing an input operation, a supporting frame for holding the display panel at an entire peripheral edge and supporting the touch panel in parallel with the display panel, a piezoelectric device disposed at a side edge of the touch panel, for applying vibration to the touch panel in accordance with the operation of the touch panel, a casing with an opening through which the touch panel is exposed and for holding the display panel and the touch panel by way of the supporting frame, and a flexible resin sheet integrally provided to the touch panel on a front surface side of the touch panel. The flexible resin sheet is formed to have a size entirely larger than a glass substrate provided on the rear surface side of the touch panel. The peripheral edge of the resin sheet is held by the rear surface of the peripheral edge of the opening of the casing and the supporting member fixed to the casing.

The supporting member and the supporting frame are integrally provided to each other. Furthermore, the supporting frame supported by a chassis inside the casing serves as the supporting member. The peripheral edge of the resin sheet is entirely held both by a holding projection formed on the rear surface of the peripheral edge of the opening of the casing and a projection edge on the upper surface of the supporting member.

The resin sheet is allowed to be the flexible substrate for the touch panel or the protective sheet made of resin applied to the front surface of the touch panel. The peripheral edge of the flexible substrate or the protective sheet of the resin sheet and the rear surface of the peripheral edge of the opening of the casing are allowed to be bonded to each other by double-sided adhesive tape or some adhesives.

In the holding structure for a touch panel related to the present invention, since the touch panel equipped with the force feedback function is fixed to the casing by the resin sheet integrally provided on the front surface of the touch panel, the touch panel is supported in a flexible way and the vibration due to the piezoelectric oscillators appear on the surface of the touch panel without damping, and an operator can experience the sure operation feeling. In addition, dust or drip will not come into the casing from the opening of the casing.

The dust-proof feature and the drip-proof feature at the interspace between the touch panel and the display panel can be improved by the supporting member and the supporting frame being integrated with each other. More secured support, dust-proof feature and drip-proof feature can be achieved, especially, by making the supporting frame serve as the supporting member, and good force feedback effects can also be achieved. Furthermore, better dust-proof feature and drip-proof feature can be achieved by bonding with adhesives.

By making the flexible substrate of the touch panel serve as the resin sheet holding the touch panel, the cost of the holding structure can be reduced, and a good force feedback function, dust-proof feature and drip-proof feature can be achieved. Or also by making a protection sheet covering the touch panel front surface serve as the resin sheet holding the touch panel, a good force feedback function, dust-proof feature and drip-proof feature can be achieved. In this way, the holding structure of an excellent design or high durability can be achieved.

DESCRIPTION OF EXEMPLARY EMBODIMENTS

Figure 1:
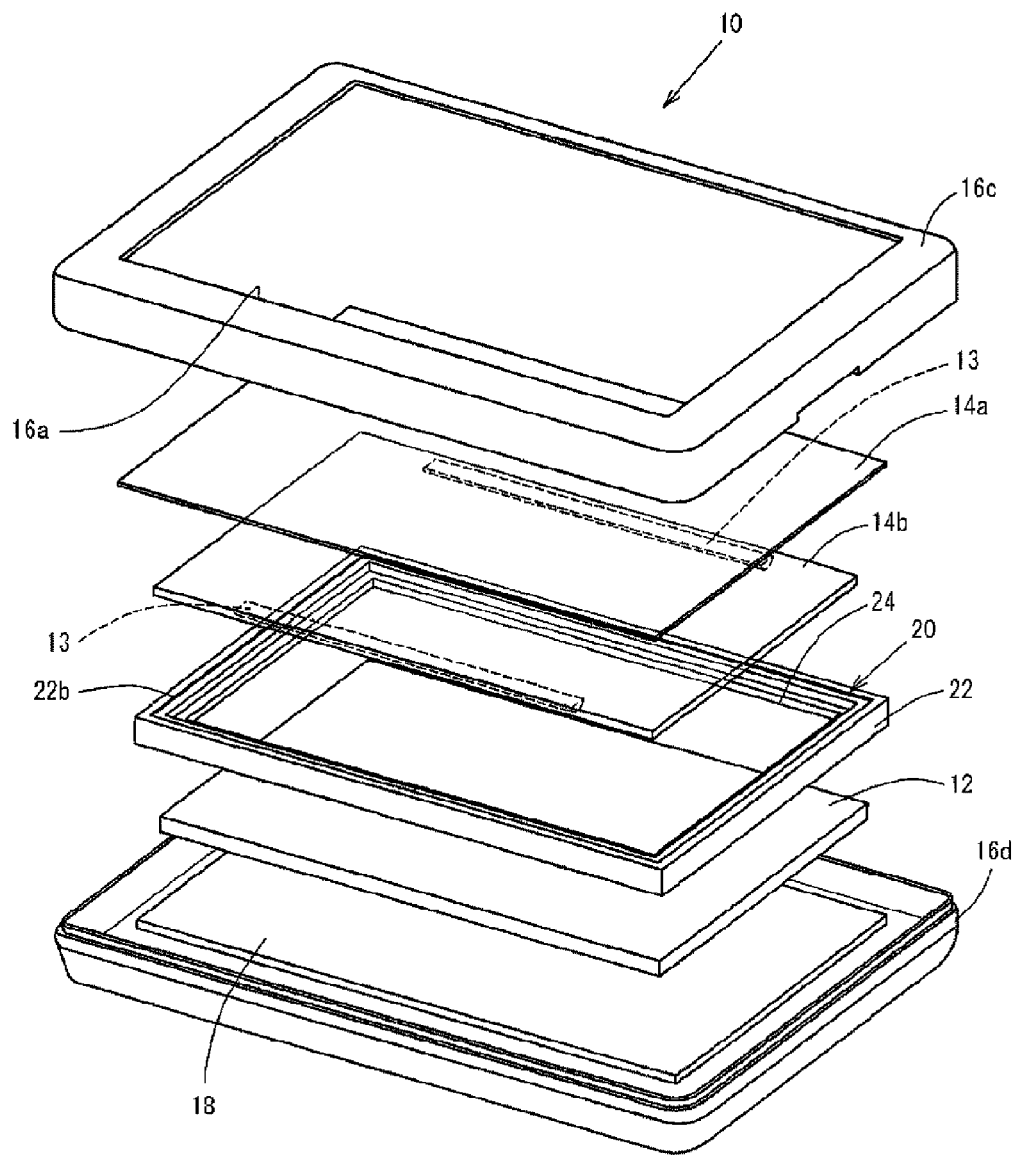
FIG. 1 shows an exploded perspective view of a touch panel device in accordance with a first embodiment of the present invention.
Figure 2:
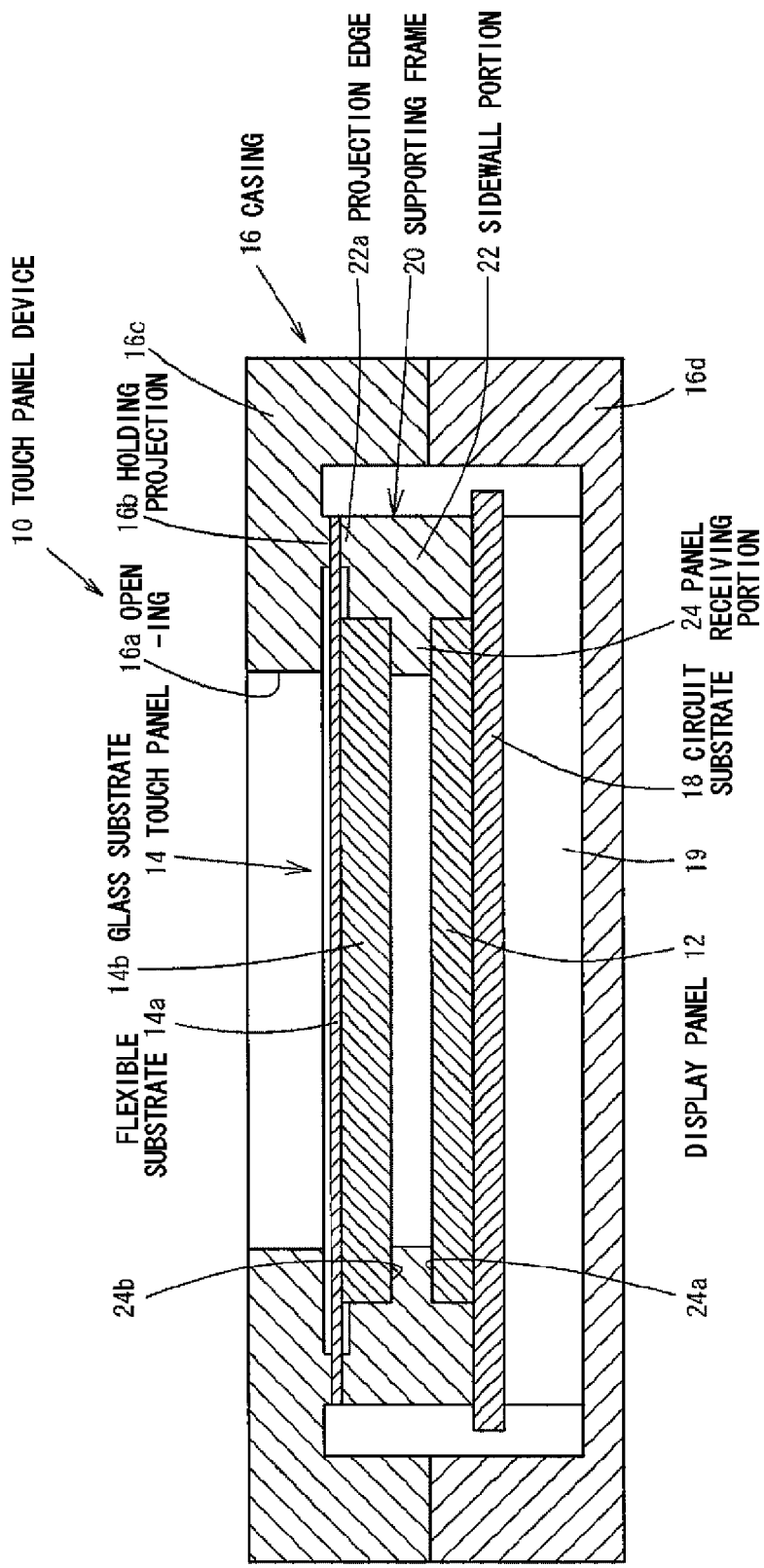
FIG. 2 shows a vertical cross-sectional view of the holding structure for a touch panel in accordance with the first embodiment of the present invention.

Hereinafter, the embodiments related to the present invention are to be explained based upon Figures. FIG. 1 and FIG. 2 show the first embodiment related to the present invention. The touch panel device 10 in the embodiment illustrates an embodiment used in a portable information terminal device.

In addition, a touch panel is also used as an input device serving as various display panels in a computer display, a vehicle navigation device, an automated teller machine, a ticket vending machine or the like. The touch panel device 10 is provided with such a display panel 12 as a liquid crystal display panel or an electroluminescence display panel and a touch panel 14 for allowing input operation, and has a casing 16 molded by resin or the like accommodating a display panel 12 and a touch panel 14. The casing 16 takes almost a box-shape being divided into two in a transverse direction, and an opening 16a is formed. The casing 16 has a front surface portion 16c where an opening 16a is formed, and a rear surface portion 16d which forms the casing 16 fitted with the front surface portion 16c. The rear portion 16d takes the symmetric shape to the front portion 16c. Furthermore, a circuit substrate 18 equipped with various circuits, a power source unit or other electronic components are accommodated in the casing 16, and are fixed at the chassis 19 integrally provided in the casing 16. The circuit substrate, the power source unit or the electronic components are not illustrated here.

The structure of the touch panel 14 is in the public domain. A flexible substrate 14a made, for example, of PET resin sheet is disposed at the front surface side of the touch panel 14, a glass substrate 14b is provided at the rear surface side, and both of the substrates face each other keeping an interspace of a certain distance. Both on the surfaces being faced each other of the flexible substrate 14a and the glass substrate 14b, transparent ITO films are formed in a predetermined pattern and as contact electrodes by the deposition or the like. Input/output electrodes are connected at the end portions of the ITO films. Dot spacers are disposed between the upper and lower substrates both on which ITO films are formed and the substrates are faced each other. When an operator presses the flexible substrate 14a side, the contact points both of the ITO films being faced each other on the front surface side flexible substrate 14a and the rear surface side glass substrate 14b get into contact. The pressed position on the touch panel 14 can be detected in accordance with the resistance value at that time. The flexible substrate 14a is formed to have a size entirely larger than a glass substrate 14b, and the resin sheet of being the flexible substrate 14b is disposed extending around the glass substrate 14b.

A predetermined length of the piezoelectric device 13 is respectively provided at the outer side surfaces of a pair of sides facing each other of the side edge of the glass substrates 14b of the touch panel 14 in order to demonstrate the force feedback function. The length of the piezoelectric device 13 is not necessary to be the whole length of the side of the touch pane 14, however, it is preferable that the length is about equal to or longer than half the length of the side. The piezoelectric device 13 is buried in the elastic adhesive and being bonded to the glass substrate 14b of the touch panel 14.

The touch panel 14 and the display panel 12 are fitted in the supporting frame 20 made of resin or rubber of a certain strength such as urethane, silicone. The supporting frame 20 is, as it is shown in FIG. 1, a frame of a rectangular shape, and is provided with a side wall portion 22 of a rectangular shape, a projection edge 22a formed at an entire periphery of the upper surface of the side wall portion 22, and a panel receiving portion 24 inwardly and entirely extending from the center part of an inner peripheral surface of a side wall portion 22. The panel receiving portion 24 is perpendicular to the inner peripheral surface and having a constant width. The panel receiving portion 24 is provided with a display panel receiving surface 24a at the rear surface side, and a touch panel receiving surface 24b facing outward.

In the assembled state, as it is shown in FIG. 2, the supporting frame 20 is disposed by the display panel 12 being fitted into the frame of the supporting frame 20 from the rear surface side and the entire peripheral edge of the display panel 12 coming into contact with the display panel receiving surface 24a of the panel receiving portion 24. The peripheral edge of the display panel 12 and the display panel receiving surface 24a are to be bonded with adhesive. It is not necessarily for the portions mentioned above to be bonded because the sidewall portion 22 encloses the display panel 12. The touch panel 14 is fitted to the touch panel receiving surface 24b of the supporting frame 20. With the state, the piezoelectric devices 13 at the side edge of the touch panel 14 are to be accommodated in the interspace due to the thickness of the touch panel supporting portion 24.

The supporting frame 20 is accommodated in the casing 16 holding the display panel 12 and the touch panel 14, and supported by the chassis 19 by way of the circuit substrate 18. At the state, as it is shown in FIG. 2, the peripheral edge of the flexible substrate 14a of the touch panel 14 is tightly held between a holding projection 16b formed at an entire peripheral edge of the rear surface of the opening 16a of the casing 16 and a projection edge 22a formed at an entire periphery of the upper surface of the side wall portion 22 of the supporting frame 20, so that the flexible substrate 14a is held and fixed. In this way, the opening 16a of the casing 16 is closed by the flexible substrate 14a of the touch panel 14, so that the dust or moisture is being prevented from entering from the opening 16a.

Each of the piezoelectric devices 13 gives rise to the vibration to the piezoelectric devices 13 and is connected to a piezoelectric device driving circuit to give a force feedback function which gives an operator an operation feeling. The piezoelectric device driving circuit is not illustrated here. In addition, cables are connected to the electrodes at the side edge of the touch panel 14, so that the input information can be transmitted to the control unit in the casing 16. The cables are not illustrated here.

Hereinafter, the function and the effect of the holding structure for a touch panel of the touch panel device 10 in this embodiment is explained. Since the touch panel 14 equipped with a force feedback function is fixed to the casing 16 by the flexible substrate 14a that constitutes the touch panel 14 and is disposed at the front surface side, the glass substrate 14b of the touch panel 14 can freely vibrate and the vibration due to the piezoelectric oscillators 13 appears at the front surface of the touch panel 14 without damping so that an operator can surely get the operation feeling. In addition, dust or drip is surely prevented from entering into the inside of the casing through the opening 16a of the casing 16.

Especially, since the flexible substrate 14a of the touch panel 14 holds the touch panel 14, the touch panel device can be thinner and the cost for the holding structure for a touch panel 14 can be reduced, and an excellent force feedback function, dust-proof feature and drip-proof feature can be achieved. Since the entire peripheral edges of the display panel 12 and the touch panel 14 are surrounded by the side wall portion 22 of the supporting frame 20, the interspace between the display panel 12 and the touch panel 14 is sealed up and the dust is prevented from entering into the interspace. Moreover, after forming a conductive pattern or electrodes at the holding projection 16b of the opening 16a of the casing 16 or the side wall portion 22 of the supporting frame 20, it is possible to connect the conductive pattern or the electrodes with the end portion electrodes of the flexible substrate 14a. The holding structure for a touch panel in this embodiment can further reduce an assembly man-hours and costs in this way.

Figure 3:
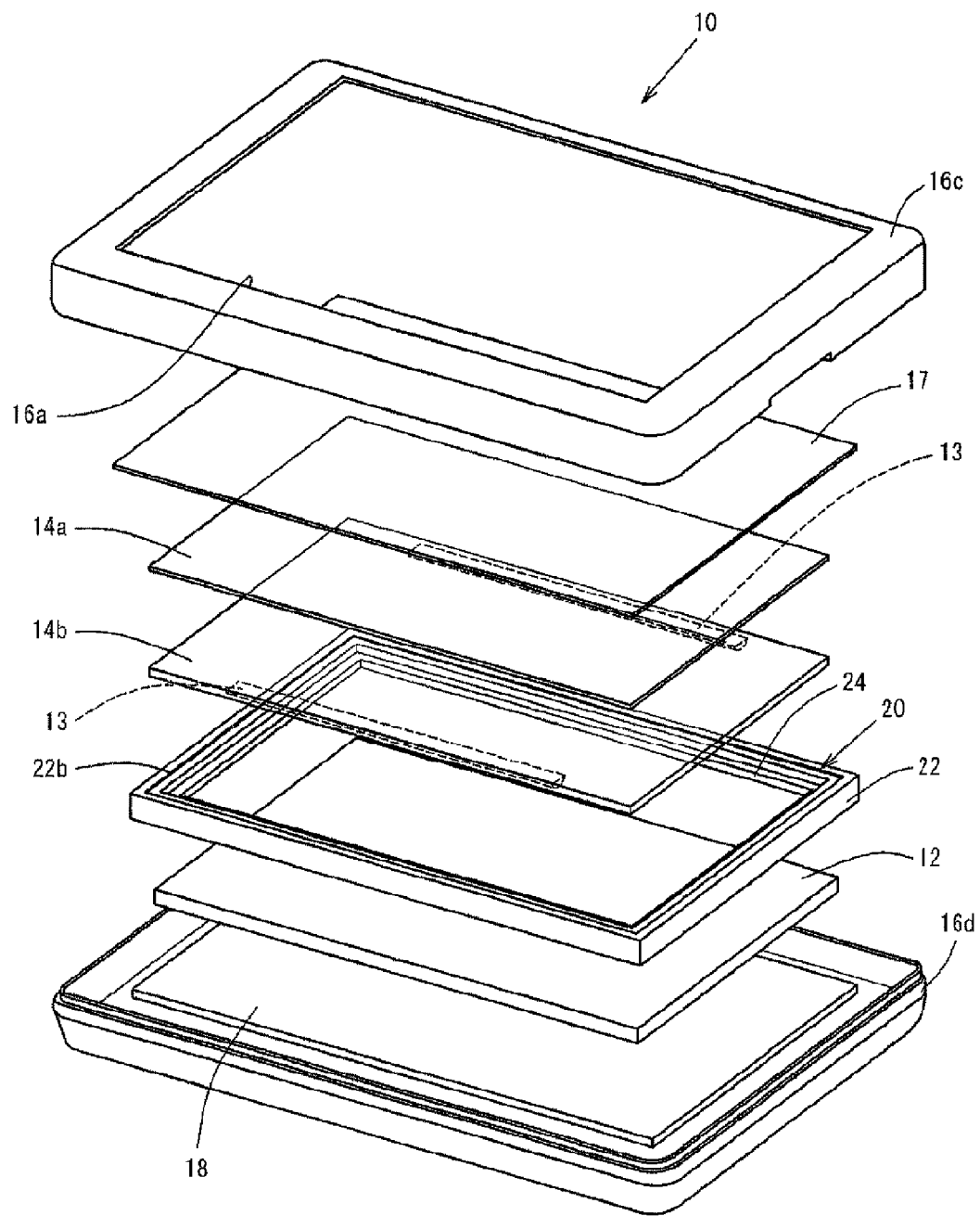
FIG. 3 shows an exploded perspective view of a touch panel device in accordance with a second embodiment of the present invention.
Figure 4:
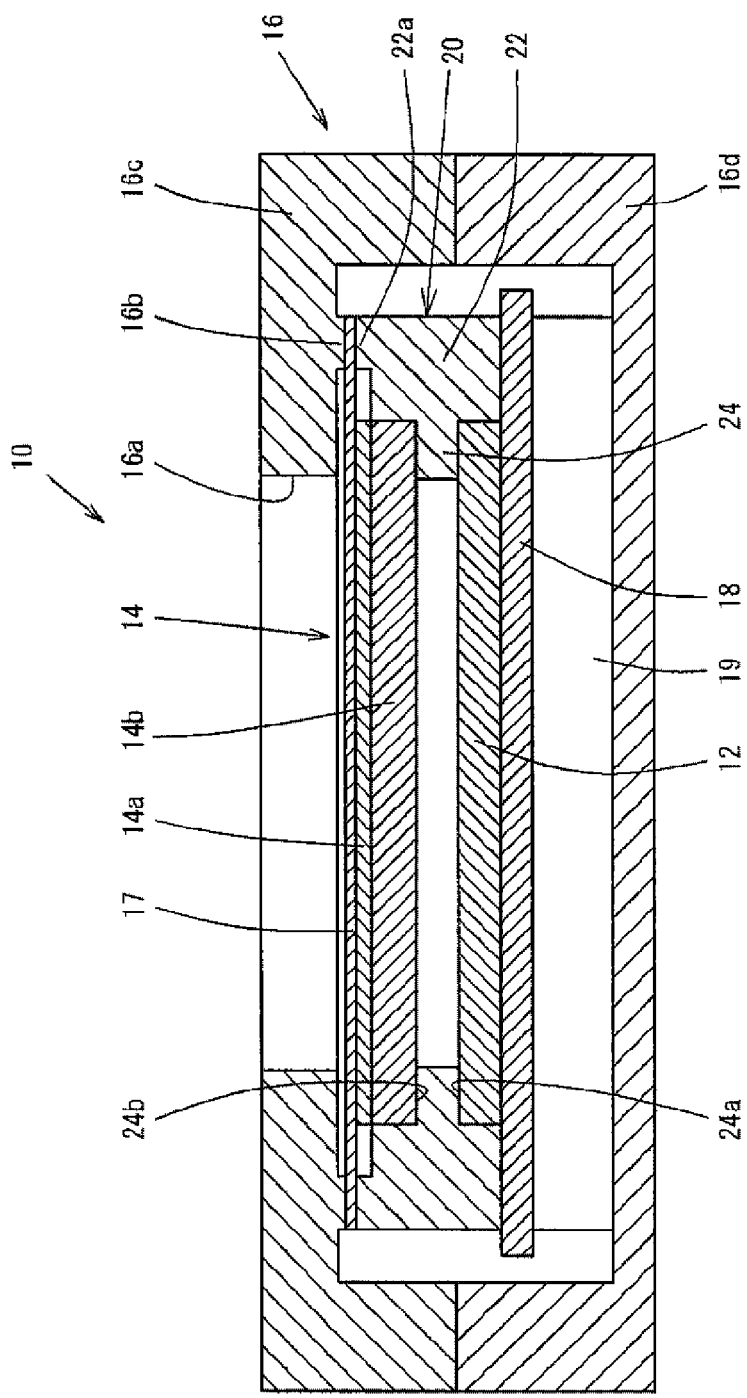
FIG. 4 shows a vertical cross-sectional view of the holding structure for a touch panel in accordance with the second embodiment of the present invention.
Figure 5:
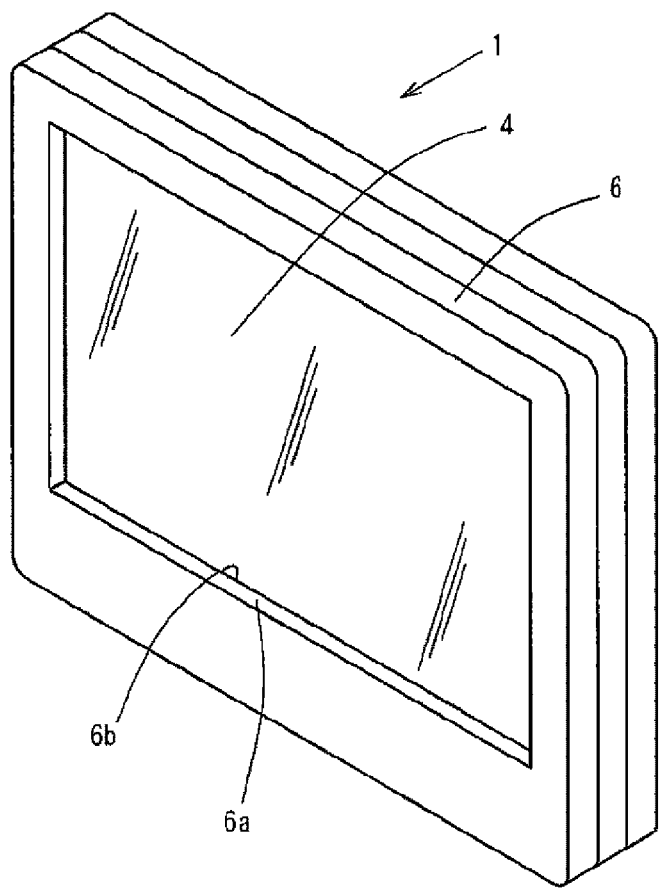
FIG. 5 shows a perspective view of the conventional touch panel device.
Figure 6:
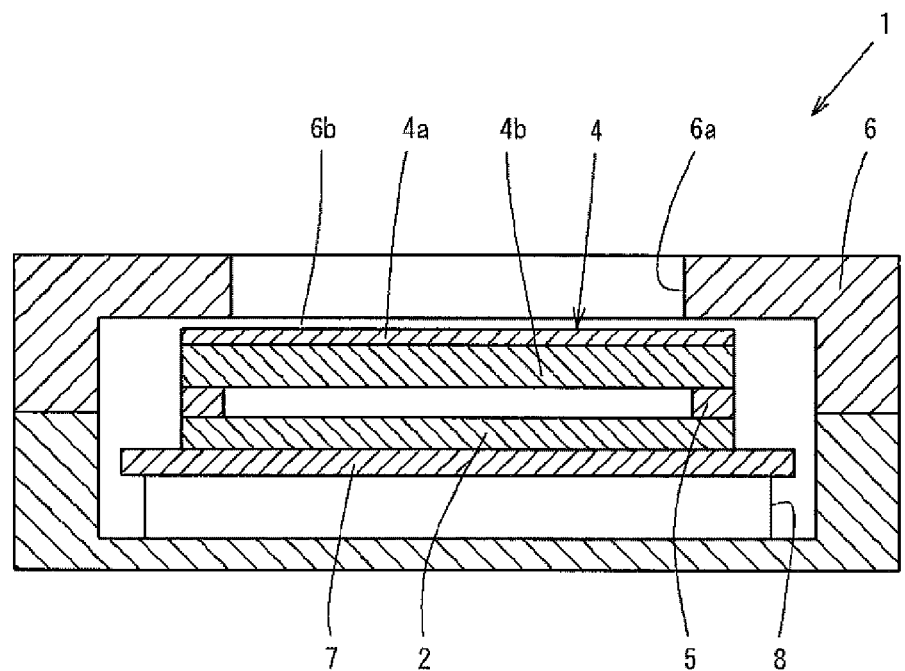
FIG. 6 shows a vertical cross-sectional view of the holding structure for the conventional touch panel.

Hereinafter, the second embodiment of a holding structure for a touch panel related to the present invention is to be explained based upon FIG. 3 and FIG. 4. Here, the same symbols are allocated to the same or similar members appeared in the embodiment mentioned above and the explanation is omitted. In the touch panel 14 in accordance with the embodiment, the flexible substrate 14a and the glass substrate 14b, both of which constitute the touch panel 14, are formed in the same size. A flexible protective sheet 17 made of PET resin or the like is applied to the front surface of the flexible substrate 14a. The protective sheet 17 is formed to have a size entirely larger than the touch panel 14 and the resin sheet of the protective sheet 17 is disposed extending at an entire periphery of the touch panel 14.

In the embodiment, the entire peripheral edge of the protective sheet 17 applied to the touch panel 14 is tightly held between the holding projection 16b formed at a peripheral edge of the rear surface side of the opening 16a of the casing 16 and the projection edge 22a formed at an entire periphery of the upper surface of the side wall portion 22 of the supporting frame 20, so that the touch panel 14 is held and fixed. In this way, the opening 16a of the casing 16 is closed by the flexible substrate 14a of the touch panel 14, so that the dust or moisture is prevented from entering from through opening 16a. In addition, the entire peripheral edge of the protection sheet 17 is tightly held between a holding projection 16b formed at a peripheral edge of the rear surface side of the casing 16 and a projection edge 22a formed at an entire periphery of the upper surface of the side wall portion 22 of the supporting frame 20, and the touch panel 14 is held and fixed. In this way, dust-proof feature and drip-proof feature is improved and the holding structure can correspond to the bigger size of display panel. In addition, since the flexible substrate 14a is not tightly held, the stress occurred in the conductive pattern on the flexible substrate 14a is small, and the flexible substrate 14a can be more durable one.

The holding structure for a touch panel in the present invention is not limited to the embodiments mentioned hereinbefore. The peripheral edge of the flexible substrate or the protective sheet of being a resin sheet, being disposed at the periphery of the glass substrate of the touch panel, and the rear surface of the peripheral edge of the opening of the casing are allowed to be bonded using double-sided adhesive tape or some adhesive. Likewise, the upper surface portion of the supporting member and the peripheral edge of the resin sheet are allowed to be bonded using double-sided adhesive tape or some adhesive. In this way, much better dust-proof feature and drip-proof feature can be achieved. In addition, the supporting member is allowed to be provided separately for the touch panel and for the supporting frame of the display member, as long as the supporting member can fix the resin sheet in the casing in a secured manner. Furthermore, the holding structure is allowed to be combined with various types of touch panels. The piezoelectric devices for the force feedback purpose are allowed to be provided at least one side, or at two sides or more.

What is claimed is:

1. A holding structure for a touch panel, comprising:
   a display panel for forming a display screen;
   a touch panel disposed outside the display panel, for allowing an input operation;
   a supporting frame for holding the display panel at an entire peripheral edge thereof and supporting the touch panel in parallel with the display panel;

a piezoelectric device disposed at a side edge of the touch panel, for applying vibration to the touch panel in accordance with the operation of the touch panel;

a casing for holding the display panel and the touch panel via the supporting frame, the casing having an opening through which the touch panel is exposed; and a flexible resin sheet integrally provided to the touch panel on a front surface side of the touch panel, wherein the flexible resin sheet is formed to have a size entirely larger than a glass substrate provided to the touch panel on a rear surface side of the touch panel, the flexible resin sheet being held at a peripheral edge thereof by a rear surface of a peripheral edge of the opening of the casing and a supporting member fixed to the casing, and the peripheral edge of the flexible resin sheet is sandwiched, at an entire periphery, between a holding projection that projects from the rear surface of the peripheral edge of the opening of the casing and a projection edge that projects from a front surface of the supporting member, and is held by the holding projection and the projection edge.

2. The holding structure for a touch panel according to claim 1, wherein the supporting member and the supporting frame are integrated with each other.

3. The holding structure for a touch panel according to claim 2, wherein the supporting frame supported by a chassis inside the casing serves as the supporting member.

4. The holding structure for a touch panel according to claim 1, wherein the peripheral edge of the flexible resin sheet is entirely bonded to the rear surface of the peripheral edge of the opening and the front surface of the supporting member.

5. The holding structure for a touch panel according to claim 1, wherein the flexible resin sheet is a flexible substrate for the touch panel.

6. The holding structure for a touch panel according to claim 1, wherein the flexible resin sheet is a protective sheet applied to the front surface of the touch panel.

7. The holding structure for a touch panel according to claim 1, wherein the supporting frame is made of resin or rubber.

8. The holding structure for a touch panel according to claim 7, wherein the supporting frame is made of rubber.

9. The holding structure for a touch panel according to claim 1, wherein the supporting frame is a frame of a rectangular shape, and
the supporting frame comprises:
a side wall portion of a rectangular shape; and
a panel receiving portion for inwardly and entirely extending from a center part of an inner peripheral surface of the side wall portion, the panel receiving portion being perpendicular to the inner peripheral surface of the side wall portion and having a constant width, and
the projection edge is formed at an entire periphery of a front surface of the side wall portion.

10. The holding structure for a touch panel according to claim 9, wherein the panel receiving portion comprises:
a display panel receiving surface for coming into contact with the display panel; and
a touch panel receiving surface for coming into contact with the glass substrate, the touch panel receiving surface being provided at an opposite side to the display panel receiving surface.

* * * * *